(12) United States Patent
Kern

(10) Patent No.: US 7,200,947 B2
(45) Date of Patent: Apr. 10, 2007

(54) BLOCK LOCK/LEVELER

(75) Inventor: Victor Michael Kern, Wadena, MN (US)

(73) Assignee: Victor M. Kern, Wadena, MN (US)

( * ) Notice: Subject to any disclaimer, the term of this patent is extended or adjusted under 35 U.S.C. 154(b) by 148 days.

(21) Appl. No.: 10/705,850

(22) Filed: Nov. 13, 2003

(65) Prior Publication Data

US 2005/0102849 A1     May 19, 2005

(51) Int. Cl.
  *G01B 1/00*     (2006.01)
(52) U.S. Cl. .............................. 33/333; 33/518; 33/370
(58) Field of Classification Search .......... 33/333–334, 33/370–372, 518
  See application file for complete search history.

(56) References Cited

U.S. PATENT DOCUMENTS 2,570,430 A * 10/1951 Cramer ........................ 33/342
4,607,437 A * 8/1986 McSorley et al. ............ 33/374
5,148,605 A * 9/1992 Julia ........................... 33/370
5,208,990 A * 5/1993 Woerlein ..................... 33/354
5,291,718 A * 3/1994 Moran ......................... 33/518
5,697,755 A * 12/1997 McCauley et al. ........... 33/333
6,058,617 A * 5/2000 Nadu ...................... 33/366.12
6,158,134 A * 12/2000 Warner et al. ................ 33/390
6,438,854 B1 * 8/2002 Kott, Jr. ...................... 33/286
6,640,455 B1 * 11/2003 Smothers ..................... 33/374
6,796,049 B1 * 9/2004 Claxton ....................... 33/527

* cited by examiner

*Primary Examiner*—Yaritza Guadalupe-McCall (57) ABSTRACT

A fully adjustable masonry block tool for lifting, transporting, laying and leveling concrete block, webbed block corner block whether flat or rock faced with an attached leveling system. Tool is designed to center on and support a cement block of substantial weight, while giving more control to block layer. This invention in its entirety is a one piece unit which will be shown and described in further detail in claims, drawings and pictures of unit design.

2 Claims, 8 Drawing Sheets

BLOCK LOCK/LEVELER

BACKGROUND OF INVENTION

1. Field of the Invention

Having been a tender for a mason, and laid block as a mason, I found no tool that Would ease fatigue on the back, keep gloves drier, or assist in leveling block without fumbling with one hand, to constantly adjust block and/or reach for a Level to square block horizontally and vertically. Having done block work for my dad and uncle, I decided to design a tool to make the task of block work easier and More efficient if I was going to be a mason, others saw my design and I decided to Make a prototype model. This tool also makes a substantial difference in the time it Takes to lay block. Being from Minnesota in cold weather, keeping gloves drier and laying block faster is a huge benefit in colder months and the added benefit of standing more upright helps to ease fatigue at the day's end.

2. Description of Related Art

Not applicable;
None that is known to applicant.

SUMMARY OF INVENTION

The invention herein illustrated is desired to be protected by a patent, and any improvements or changes in design or materials used protected.

BRIEF DESCRIPTION OF THE DRAWINGS

The present invention will be understood more fully from the detailed description herein below and from accompanying drawings of the invention, which are given to explain invention only, and are not intended to limit the present invention.

In the drawings.

DETAILED DESCRIPTION OF DRAWINGS

Figure 1:
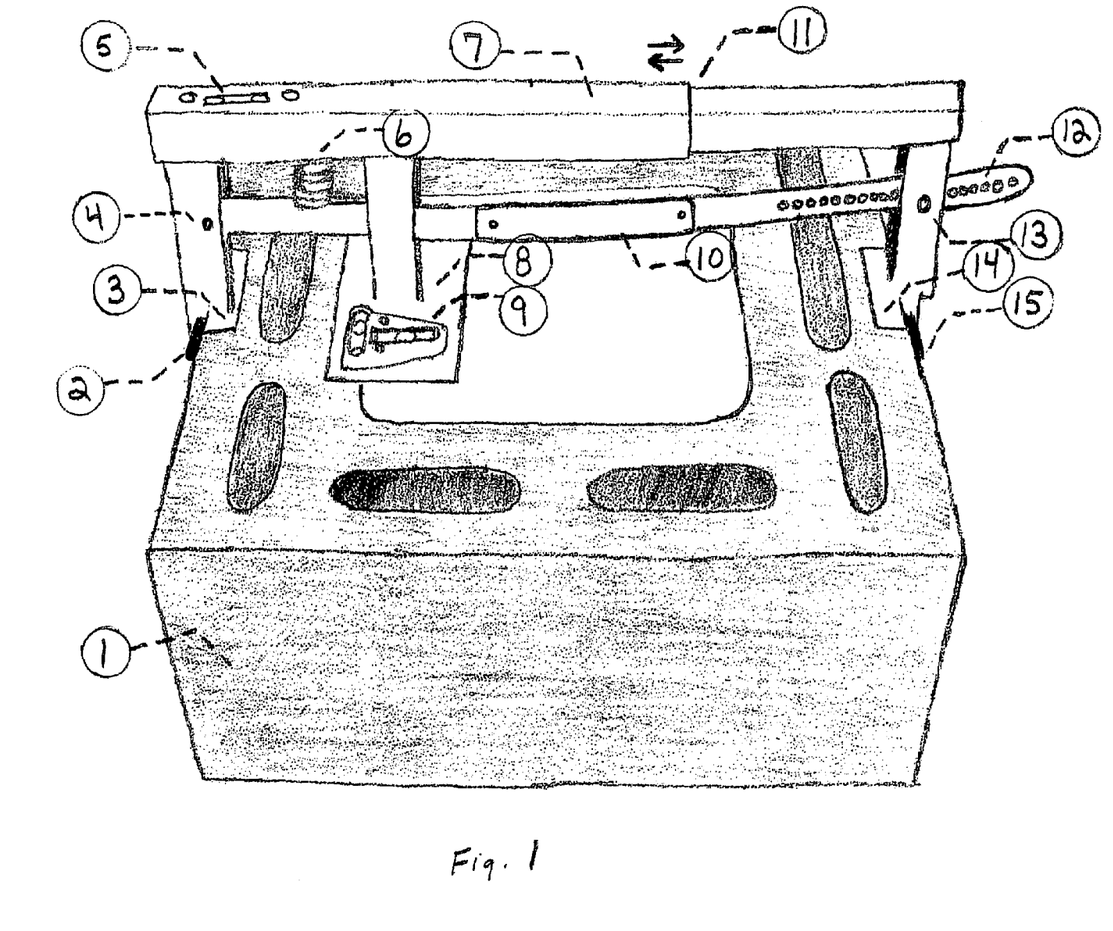
FIG. 1 is a schematic view showing tool unit set on chimney block showing related components of tool, same concept if block is corner or flat faced.

FIG. 1 is a side view of invention set on chimney block (1) showing related components, the frame assembly (7) (11), initial adjustment is established by adjustment pin (13), then as handle (10) is raised, the friction plates grip sides of block, (2) (15) also stabilizer plates keep the block from any wobble effect (3) (14). The block can be leveled by horizontal/vertical level (9) on leveling plate (8) or by using the horizontal inset bubble level on frame (5). The block can be released by allowing less tension on handle, causing release spring (6) to push frame outward at points (4) and (13).

DETAILED DESCRIPTION OF DRAWINGS

Figure 2:
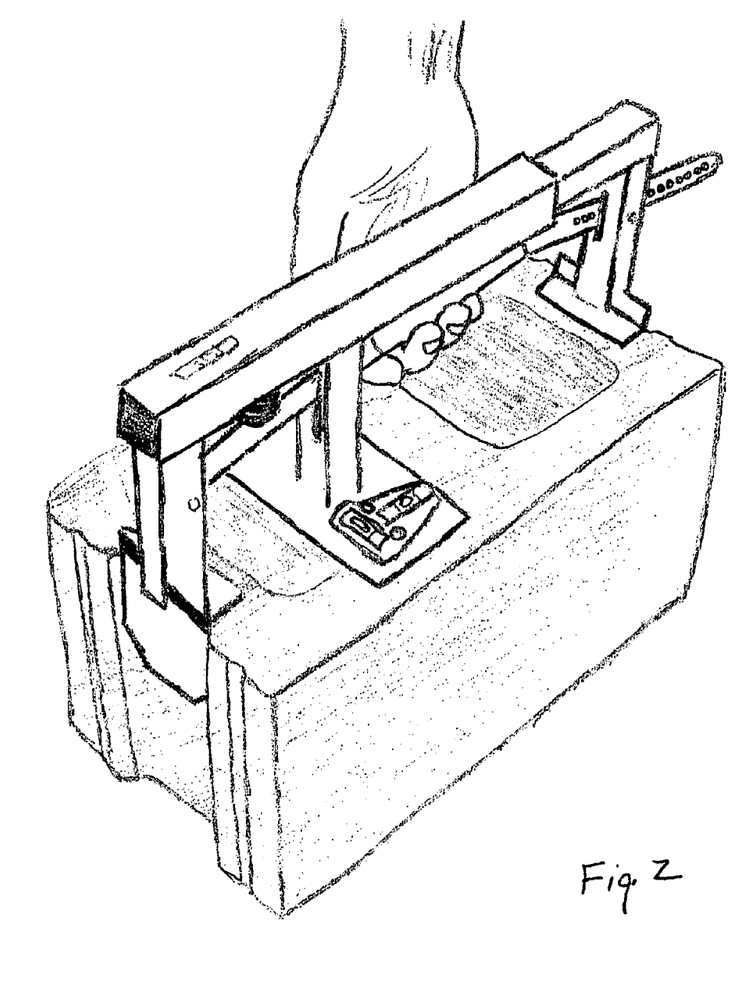
FIG. 2 is a schematic end/top view showing friction plate of tool and handle operation on webbed block, same concept if block is corner or rock faced.

FIG. 2 is a top/end view of invention sat on regular 16" block this schematic shows handle movement (10), friction plate (2), the leveling system (5), (9), the block can then be transported or laid and block can be picked up in a vertical or horizontal position.

Figure 3:
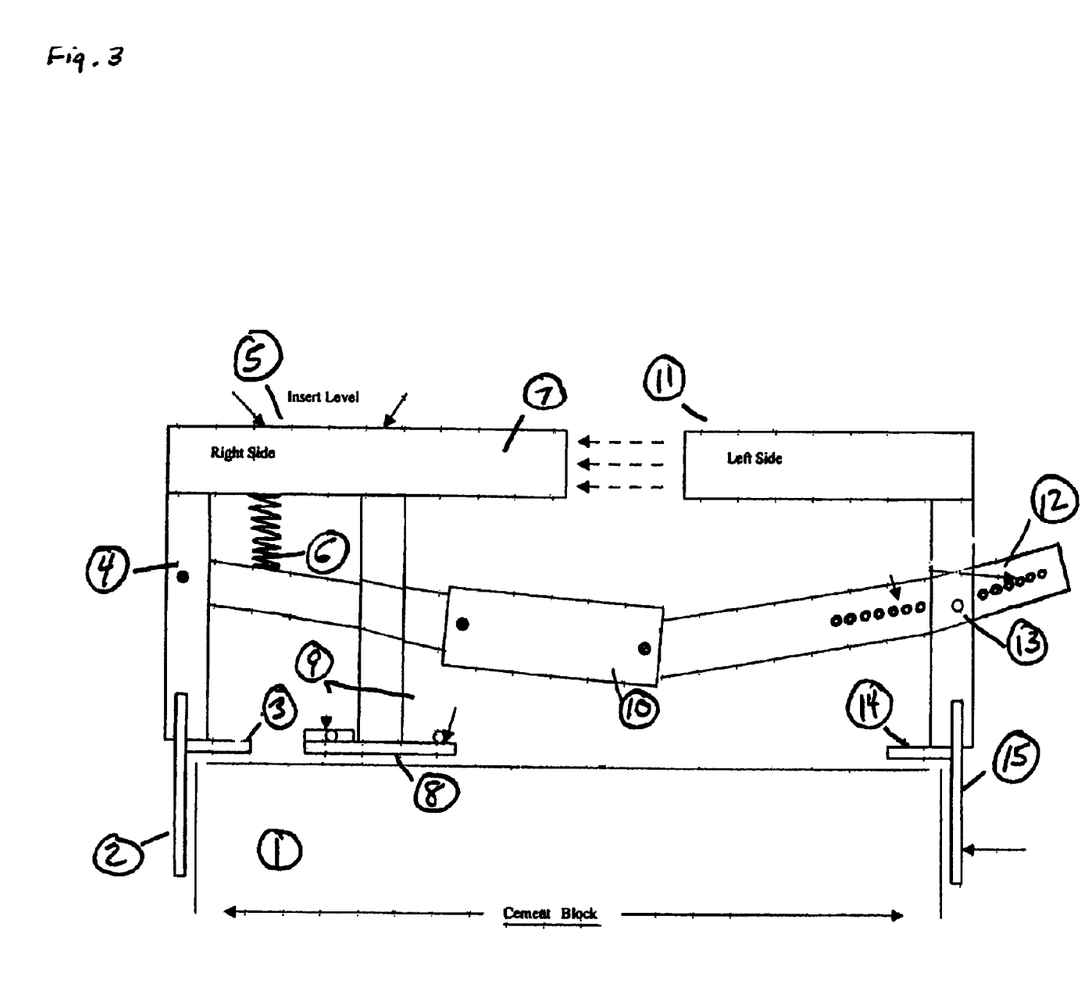
FIG. 3 is a schematic side view of invention set on block without adjustment pin to show range of motion in inward or outward range of handle movement

FIG. 3 is a schematic side view of invention showing related components as illustrated in FIG. 1, also shows the range of adjustment to varied block sizes from 15½ to 19¼". Frame assembly (7), (11), are made to slide into each other upon initial setup on block, adjustment pin (13), inserted then block can be carried, transported or laid without readjustment of pin, unless different block size is used. This schematic also shows the handle movement in relation to block the inward range is ¼ to ⅝" to keep friction plates tight on block sides and a outward range of ¼ to ⅜" to insure no disturbance of mud (mortar) joint on block while setting.

Figure 4:
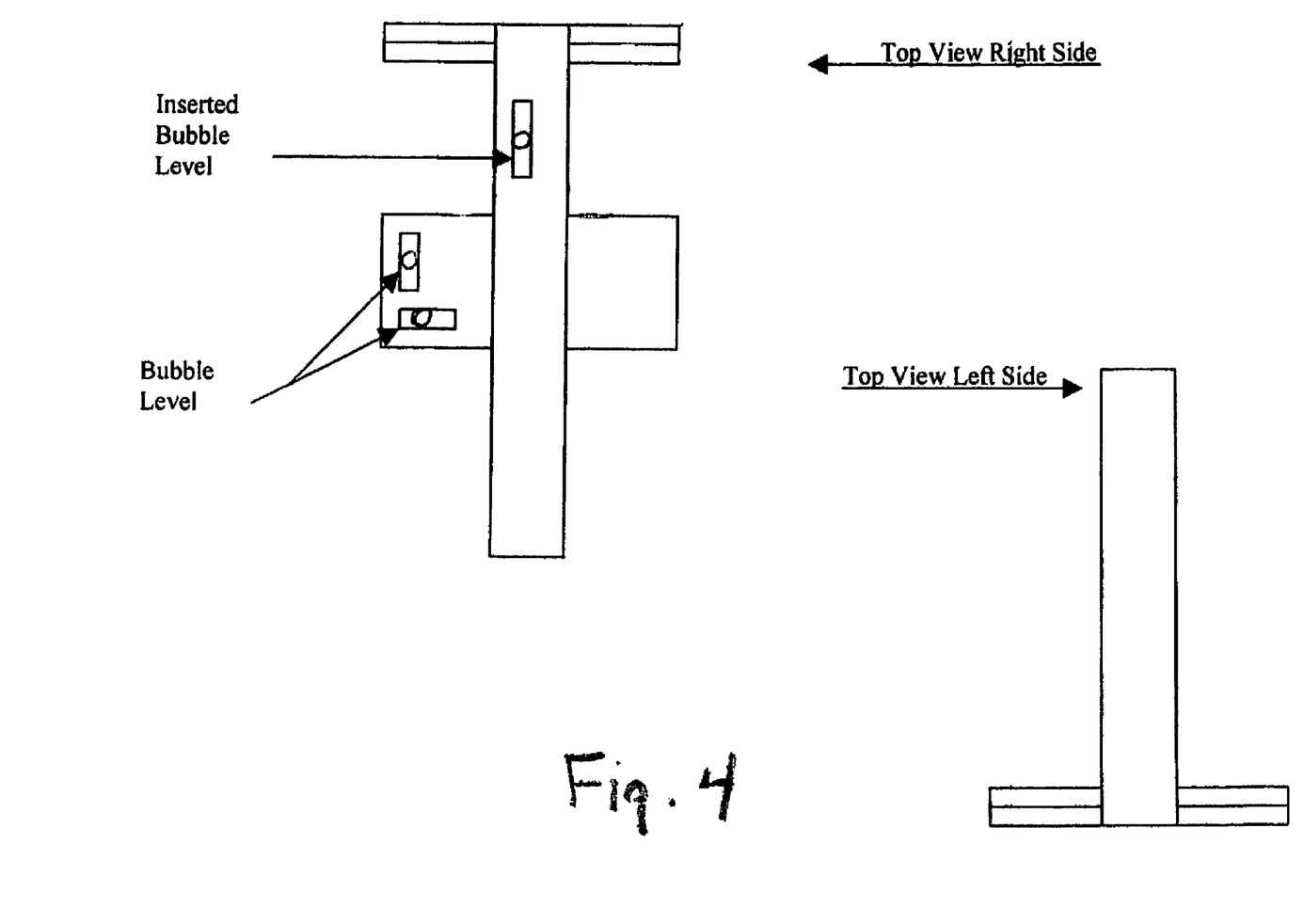
FIG. 4 is a schematic top view of invention showing right and left halves.

FIG. 4 is a top view of invention showing tool disassembled to show leveling system, and frame assembly which is split in right/left sides to better show range of invention in relation to varied block sizes.

Figure 5:
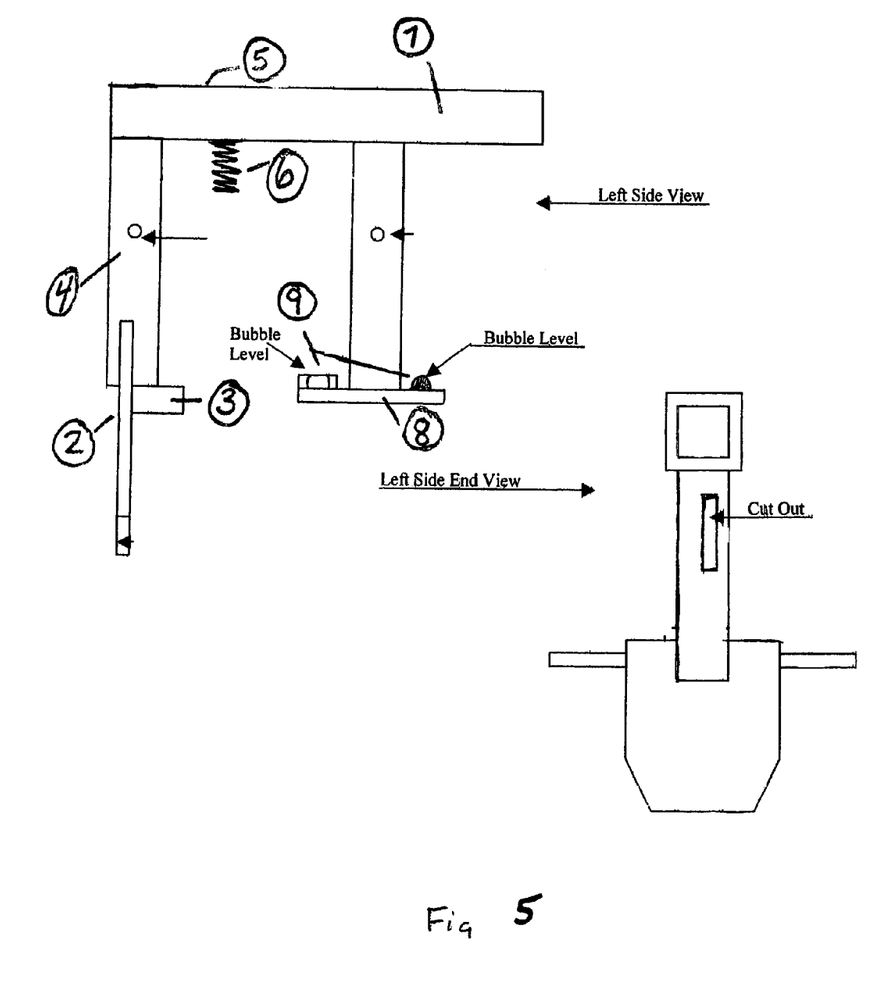
FIG. 5 is a schematic side/end view of left side showing leveling plate and friction plate.

FIG. 5 is a side/end view of left half of frame assembly showing the friction plate (2), the stabilizer plate (3), the leveling plate (8), attached horizontal/vertical bubble level (9), also shows the height of invention in relation to cement block which is 5 inches.

Figure 6:
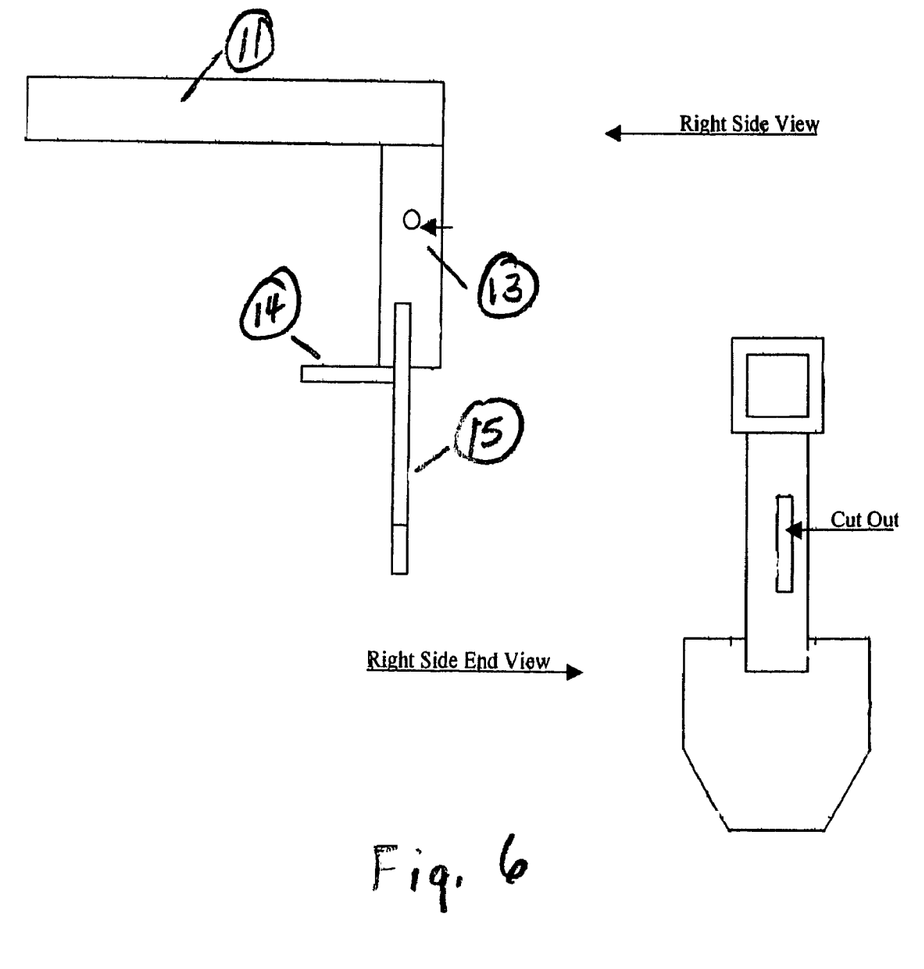
FIG. 6 is a schematic side view of right side showing adjuster pin hole and friction plate.

FIG. 6 is a side/end view of right half of frame assembly showing the friction plate (15), stabilizer plate (14), also shows height of invention in relation to cement block which is 5 inches.

Figure 7:
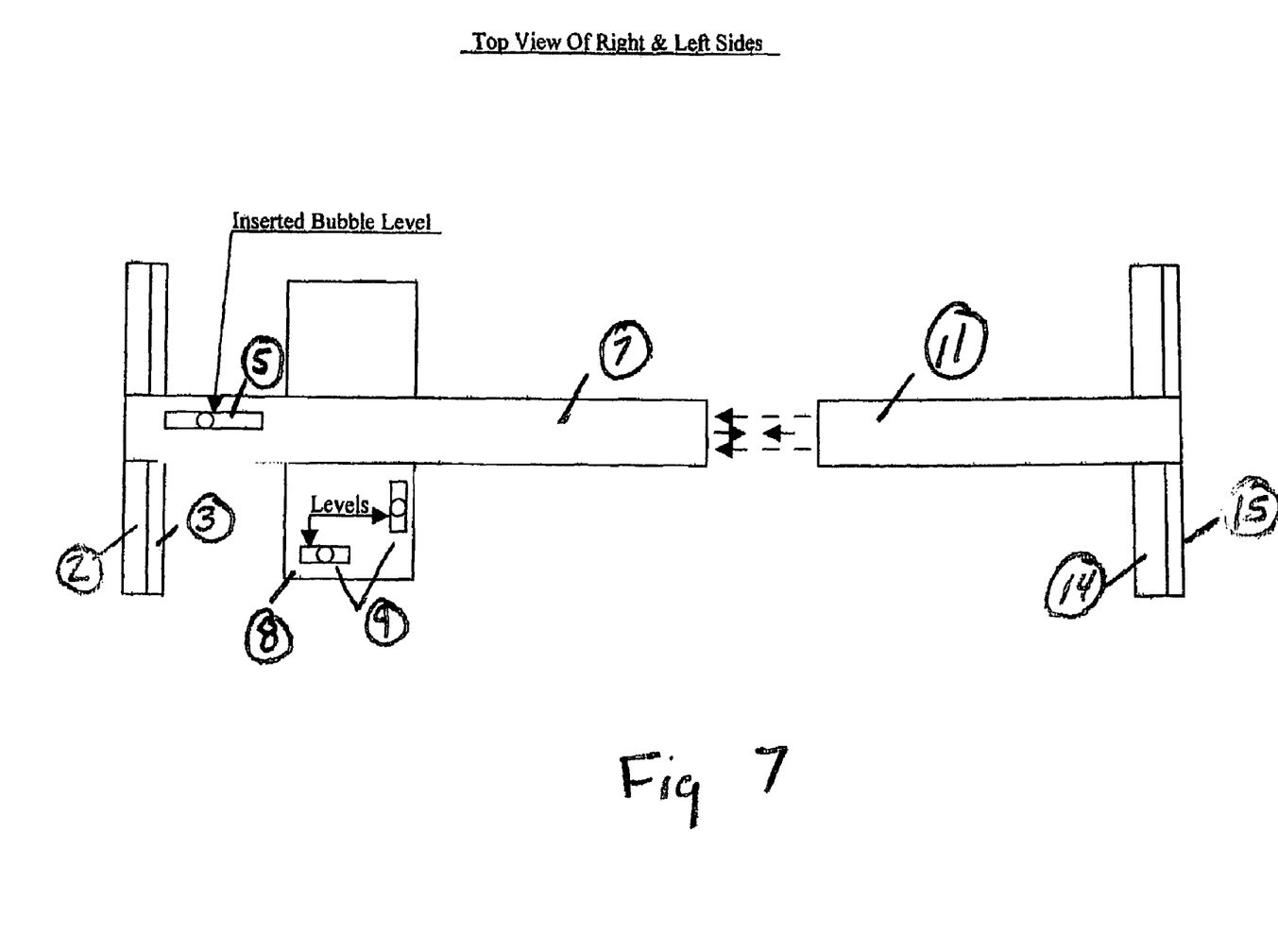
FIG. 7 is a schematic top view showing leveling system and tool range of motion.

FIG. 7 is a schematic top view of invention in relation to FIG. 1 showing inward/outward range of tool adjustment and shows leveling system.

Figure 8:
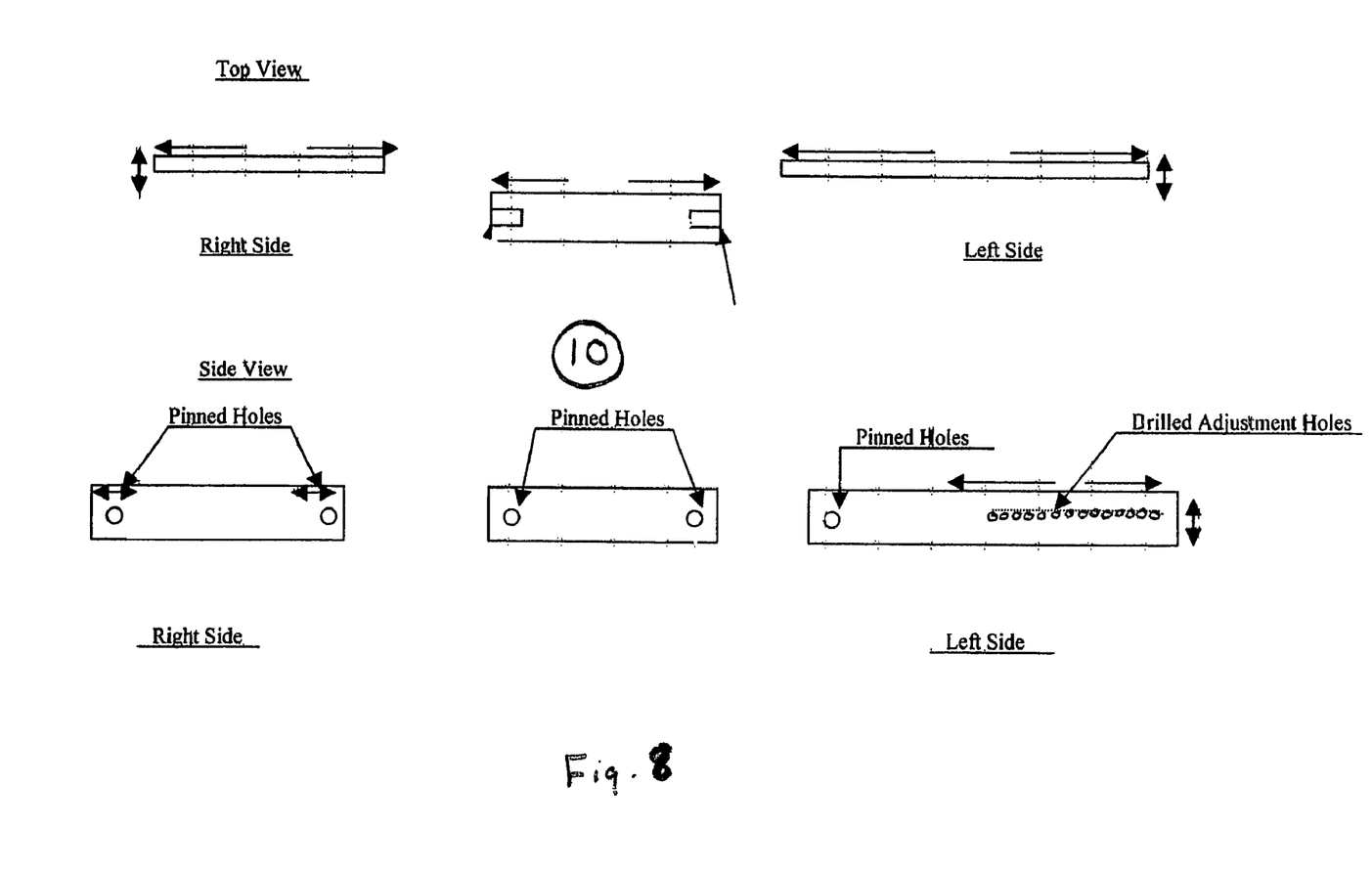
FIG. 8 is a schematic view of handle assembly and adjustment holes.

FIG. 8 is a breakdown view of handle components in relation to FIG. 1 (10), Showing pivot points and adjustment hole location.

What I claim is:

1. A masonry block lock/leveling tool that is fully adjustable in a range from 15½ to 19¼ inches accommodating any webbed block, corner block, chimney block or rock faced block, comprising:

a. means for moving/laying concrete block, utilizing stability of said block by a combination of opposing vertical friction plates and opposing horizontal stabilizer plates welded to base of a split male/female 5 inch high "C" frame assembly, and b. pinned together at opposing ends of said "C" frame by a handle assembly, which is made of steel, with 3/16" keyed adjustment holes on male side of "C" frame assembly allowing said "C" frame to be set on desired cement block adjusted to block size and with adjusting pin set, allow mason or block tender a firm one handed grip on block with upward movement of handle which causes "C" frame to contract ¼ to ⅝" depending on block dimension; and c. means of releasing block by said handle assembly and a steel compression spring welded to undercarriage of female side of "C" frame which causes "C" frame to expand by handle release ¼ to ½" combined to insure no disturbance of mortar joint on previous block.

2. The apparatus of claim 1, wherein the right side of said "C" frame has a vertical welded 5 inch leg midway, with welded leveling plate at base and attached replaceable horizontal/vertical plastic bubble levels for leveling concrete block vertically and horizontally without using a separate conventional level; and a. means of said means of initial horizontal leveling of said block with the aid of a replaceable inset plastic bubble level mounted to right side top center of "C" frame assembly; and b. components of said invention of claim 1 made of steel or other suitable alloy that will withstand the rigors and abuse of cement block use, with the exception of bubble levels made of plastic.

* * * * *